US009621873B2

(12) United States Patent
Kuno

(10) Patent No.: US 9,621,873 B2
(45) Date of Patent: Apr. 11, 2017

(54) APPARATUS INCLUDING FUNCTION TO GENERATE STEREOSCOPIC IMAGE, AND METHOD AND STORAGE MEDIUM FOR THE SAME

(71) Applicant: CASIO COMPUTER CO., LTD., Shibuya-ku, Tokyo (JP)

(72) Inventor: Toshiya Kuno, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 496 days.

(21) Appl. No.: 13/904,996

(22) Filed: May 29, 2013

(65) Prior Publication Data

US 2013/0321592 A1  Dec. 5, 2013

(30) Foreign Application Priority Data

May 31, 2012  (JP) ................................. 2012-123868

(51) Int. Cl.
  H04N 13/02    (2006.01)
  H04N 9/09     (2006.01)
(52) U.S. Cl.
  CPC ..... *H04N 13/0207* (2013.01); *H04N 13/0221* (2013.01)
(58) Field of Classification Search
  CPC ....................... H04N 13/0207; H04N 13/0221
  See application file for complete search history.

(56) References Cited

U.S. PATENT DOCUMENTS

2011/0007135 A1* 1/2011 Okada ................. G11B 27/322
  348/46
2011/0280562 A1* 11/2011 Ueda ...................... G03B 17/14
  396/324

(Continued)

FOREIGN PATENT DOCUMENTS

JP      06-030446     2/1994
JP      07067022 A    3/1995

(Continued)

OTHER PUBLICATIONS

Japanese Office Action dated Dec. 24, 2013 (and English translation thereof) in counterpart Japanese Application No. 2012-123868.

(Continued)

*Primary Examiner* — Dave Czekaj
*Assistant Examiner* — Tsion B Owens
(74) *Attorney, Agent, or Firm* — Holtz, Holtz & Volek PC

(57) ABSTRACT

A single lens imaging apparatus which generates a stereoscopic image includes a single imaging lens section which is rotatable around an axis along a first direction orthogonal to an optical axis so that a relationship of a position of background with respect to a subject in an optical image is changed. A first driving section rotates the single imaging lens section around the axis. An obtaining section including a moveable imaging element obtains two image signals at different times corresponding to two optical images which respectively pass through the single imaging lens section at different times before and after a rotation thereof by the first driving section and in which the relationship of the position of the background with respect to the subject is different. A generating section generates image data of a stereoscopic image based on the two image signals respectively obtained before and after the rotation.

15 Claims, 8 Drawing Sheets

(56) References Cited

U.S. PATENT DOCUMENTS

| | | | | |
|---|---|---|---|---|
| 2011/0292183 A1* | 12/2011 | Tajiri | ............... | H04N 13/0022 348/50 |
| 2012/0140100 A1* | 6/2012 | Shibazaki | ......... | H01L 27/14621 348/281 |
| 2012/0154551 A1* | 6/2012 | Inoue | ............... | H04N 13/0022 348/49 |
| 2012/0154647 A1* | 6/2012 | Endo | ............... | H04N 13/0239 348/262 |
| 2012/0162453 A1 | 6/2012 | Murayama et al. | | |
| 2013/0100311 A1* | 4/2013 | Ogasahara | ............ | H04N 9/045 348/223.1 |
| 2013/0202191 A1* | 8/2013 | Wang | ............... | G06T 7/0065 382/154 |

FOREIGN PATENT DOCUMENTS

| | | |
|---|---|---|
| JP | 10155104 A | 6/1998 |
| JP | 2005-167310 A | 6/2005 |
| JP | 2006-154800 | 6/2006 |
| JP | 2010-041381 | 2/2010 |
| JP | 2010-166229 A | 7/2010 |
| JP | 2010-210691 | 9/2010 |
| JP | 2010210691 A | 9/2010 |
| JP | 2011119995 A | 6/2011 |
| JP | 2011-142644 A | 7/2011 |
| JP | 2011205385 A | 10/2011 |
| JP | 2011250352 A | 12/2011 |
| JP | 2012053113 A | 3/2012 |
| JP | 2012053303 A | 3/2012 |
| JP | 2012-133185 A | 7/2012 |

OTHER PUBLICATIONS

Japanese Office Action dated Mar. 18, 2014 (and English translation thereof) in counterpart Japanese Application No. 2012-123868.
Japanese Office Action dated Jul. 16, 2013 (and English translation thereof) in counterpart Japanese Application No. 2012-123868.
Japanese Office Action dated Oct. 1, 2013 (and English translation thereof) in counterpart Japanese Application No. 2012-123868.
Japanese Office Action (and English translation thereof) dated Aug. 18, 2015, issued in counterpart Japanese Application No. 2012-123868.

* cited by examiner

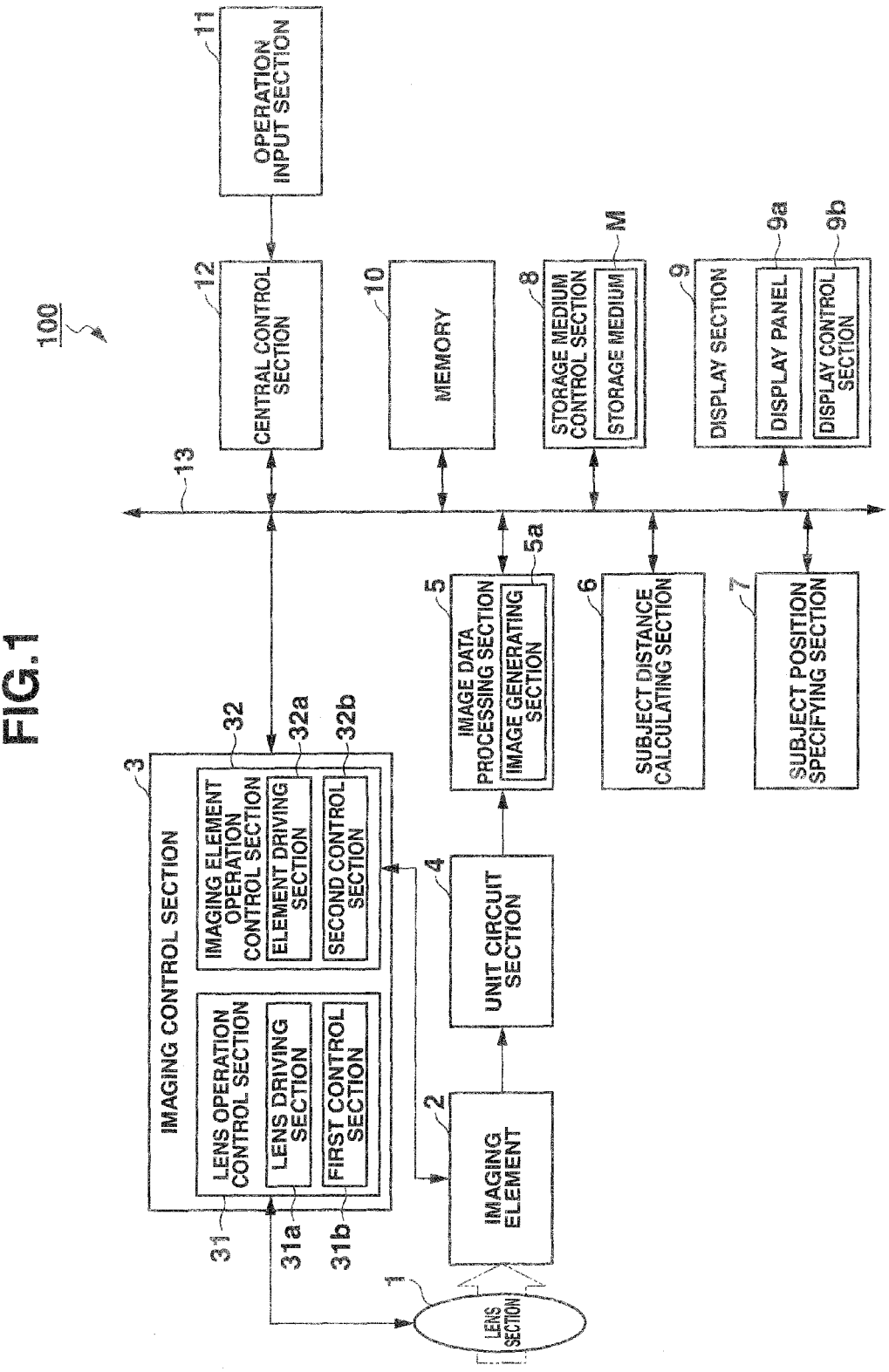

APPARATUS INCLUDING FUNCTION TO GENERATE STEREOSCOPIC IMAGE, AND METHOD AND STORAGE MEDIUM FOR THE SAME

CROSS-REFERENCE TO RELATED APPLICATIONS

This application is based upon and claims the benefit of priority from the prior Japanese Patent Application No. 2012-123868, filed May 31, 2012, the entire contents of all of which are incorporated herein by reference.

BACKGROUND OF THE INVENTION

1. Field of the Invention

The present invention relates to a technique to generate a stereoscopic image.

2. Description of the Related Art

Conventionally, there is known a twin lens imaging apparatus which is provided with two sets of imaging lenses positioned with a space close to the space between the two eyes of a human and obtaining an image with a disparity similar to the two eyes of a human to capture a 3D image.

There is also known a technique which uses a single lens imaging apparatus to obtain a plurality of images with a disparity by high speed continuous shooting while swinging the apparatus in a predetermined direction to generate a 3D image.

Then, with a twin lens imaging apparatus, the size of the case cannot be made smaller than the space between the two sets of lenses and this drastically decreases portability. Moreover, among the components of the apparatus, if the number of components such as imaging lens, imaging element, etc., which are relatively expensive increases, the cost of the apparatus also increases.

SUMMARY OF THE INVENTION

A single lens imaging apparatus according to an aspect of the present invention includes: a single imaging lens section which is rotatable around an axis along a first direction orthogonal to an optical axis so that a relationship of a position of background with respect to a subject in an optical image is changed; a first driving section which rotates the single imaging lens section around the axis; an obtaining section which an obtaining section which includes an imaging element; a second driving section which moves the imaging element along a second direction in which the imaging element is moveable; and a second control section which controls the second driving section to move the imaging element in a same direction as a direction in which the optical axis of the single imaging lens section is displaced by the rotation of the single imaging lens section by the first driving section, wherein the second control section adjusts a movement amount of the imaging element by the second driving section based on a position of the subject in a field of view, and wherein the obtaining section obtains, at different times, two image signals by performing photoelectric conversion with the imaging element which is moved by the second driving section by the movement amount which is adjusted by the second control section, the two image signals corresponding to two optical images which respectively pass through the single imaging lens section at different times before and after a rotation thereof by the first driving section and in which the relationship of the position of the background with respect to the subject is different; and a generating section which generates image data of a stereoscopic image based on the two image signals respectively obtained by the obtaining section before and after the rotation. When the subject is displaced in one direction along the second direction from substantially a center portion of the angle of view, the second control section controls the second driving section to move the imaging element such that the movement amount of the imaging element in a first moving direction determined in accordance with the one direction is larger than the movement amount of the imaging element in a second moving direction opposite to the first moving direction.

A method according to another aspect of the present invention is implemented by a single lens imaging apparatus (i) a single imaging lens section which is rotatable around an axis along a first direction orthogonal to an optical axis so that a relationship of a position of background with respect to a subject in an optical image is changed; (ii) a first driving section which rotates the single imaging lens section around the axis; (iii) an imaging element; and (iv) a second driving section which moves the imaging element along a second direction in which the imaging element is moveable. The method includes: rotating, by the first driving section, the single imaging lens section around the axis; moving, by the second driving section, the imaging element in a same direction as a direction in which the optical axis of the single imaging lens section is displaced by the rotation of the single imaging lens section by the first driving section, and adjusting a movement amount of the imaging element by the second driving section based on a position of the subject in a field of view; obtaining, at different times, two image signals by performing photoelectric conversion with the imaging element which is moved by the second driving section by the adjusted movement amount, the two image signals corresponding to two optical images which respectively pass through the single imaging lens section at different times before and after a rotation thereof by the first driving section and in which the relationship of the position of the background with respect to the subject is different; and generating image data of a stereoscopic image based on the two image signals respectively obtained by the obtaining before and after the rotation. When the subject is displaced in one direction along the second direction from substantially a center portion of the angle of view, the second driving section is controlled to move the imaging element such that the movement amount of the imaging element in a first moving direction determined in accordance with the one direction is larger than the movement amount of the imaging element in a second moving direction opposite to the first moving direction.

A non-transitory computer-readable storage medium according to another aspect of the present invention has stored thereon a program executable by a computer of a single lens imaging device including (i) a single imaging lens section which is rotatable around an axis along a first direction orthogonal to an optical axis so that a relationship of a position of background with respect to a subject in an optical image is changed; (ii) a first driving section which rotates the single imaging lens section around the axis; (iii) an imaging element; and (iv) a second driving section which moves the imaging element along a second direction in which the imaging element is moveable. The program controls the computer to perform functions including: controlling the first driving section to rotate the single imaging lens section around the axis; controlling the second driving section to move the imaging element in a same direction as a direction in which the optical axis of the single imaging lens section is displaced by the rotation of the single imaging lens section by the first driving section, and adjusting a movement amount of the imaging element by the second driving section based on a position of the subject in a field of view; obtaining, at different times, two image signals by performing photoelectric conversion with the imaging element which is moved by the second driving section by the adjusted movement amount, the two image signals corresponding to two optical images which respectively pass through the single imaging lens section at different times before and after a rotation thereof by the first driving section and in which the relationship of the position of the background with respect to the subject is different; and generating image data of a stereoscopic image based on the two image signals respectively obtained by the obtaining before and after the rotation. When the subject is displaced in one direction along the second direction from substantially a center portion of the angle of view, the second driving section is controlled to move the imaging element such that the movement amount of the imaging element in a first moving direction determined in accordance with the one direction is larger than the movement amount of the imaging element in a second moving direction opposite to the first moving direction.

BRIEF DESCRIPTION OF THE DRAWINGS

The present invention and the above-described objects, features and advantages thereof will become more fully understood from the following detailed description with the accompanying drawings and wherein;

FIG. 1 is a diagram showing a schematic configuration of an imaging apparatus of one embodiment in which the present invention is applied;

DETAILED DESCRIPTION OF THE PREFERRED EMBODIMENTS

The present invention is described in detail with reference to the drawings. However, the scope of the invention is not limited to the illustrated examples.

Figure 2A:
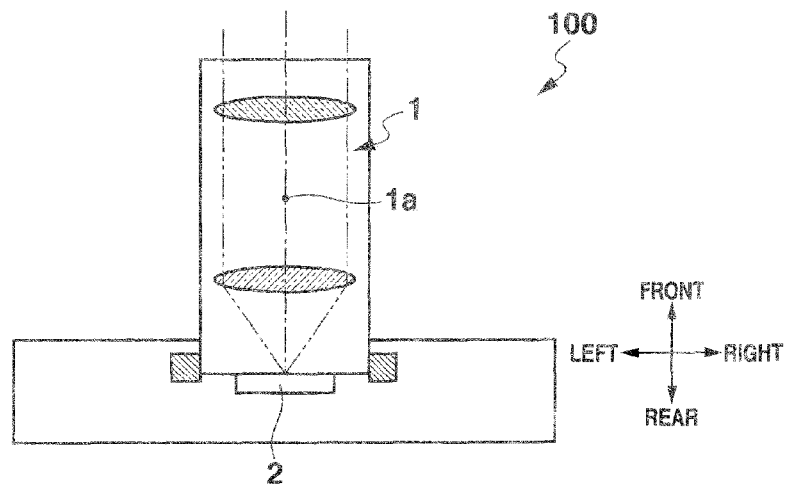
FIG. 2A to FIG. 2C are diagrams schematically showing an operation of a lens section and an imaging element composing the imaging apparatus as shown in FIG. 1.
Figure 2B:
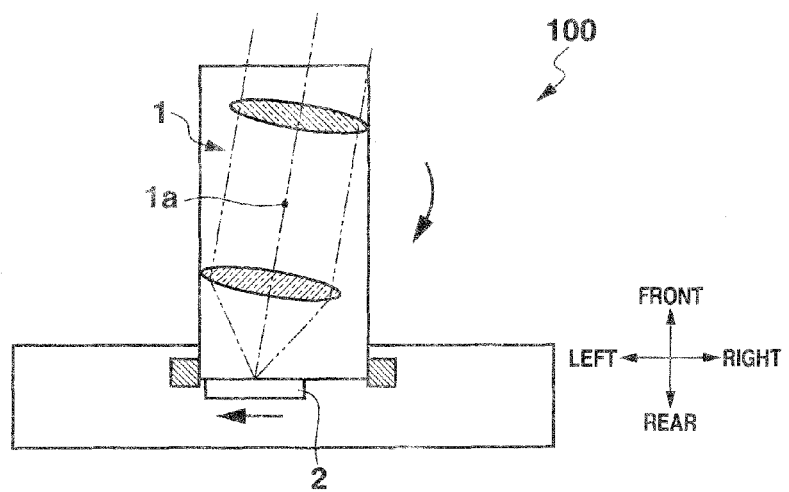
Figure 2C:
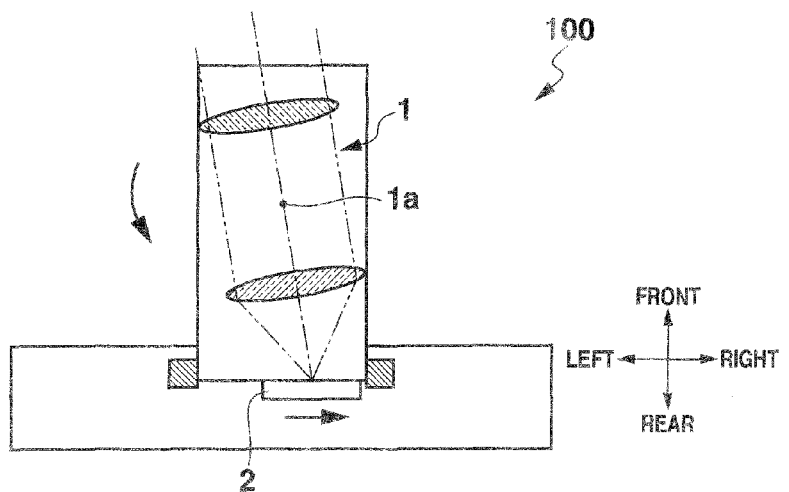

FIG. 1 is a diagram showing a schematic configuration of an imaging apparatus 100 of an embodiment in which the present invention is applied. FIG. 2A to FIG. 2C are diagrams schematically showing the operation of a lens section 1 and an imaging element 2 composing the imaging apparatus 100.

In the description below, an exposed face of the lens section 1 of the apparatus is to be a front face and a face on the opposite side is to be a rear face. A direction which is orthogonal to a front and rear direction is to be a left and right direction of the apparatus, and a direction which is orthogonal to both the front and rear direction and the left and right direction is to be an upper and lower direction of the apparatus.

The imaging apparatus 100 of the present embodiment includes a set of the lens section 1 and the imaging element 2, and generates image data of a stereoscopic image G3 (see FIG. 7) of a single lens format. Specifically, as shown in FIG. 1, the imaging apparatus 100 includes, the lens section 1, the imaging element 2, an imaging control section 3, a unit circuit section 4, an image data processing section 5, a subject distance calculating section 6, a subject position specifying section 7, a storage medium control section 8, a display section 9, memory 10, an operation input section 11, a central control section 12, and the like.

The imaging control section 3, the image data processing section 5, the subject distance calculating section 6, the subject position specifying section 7, the storage medium control section 8, the display section 9, the memory 10 and the central control section 12 are connected to each other through a bus line 13.

The lens section (imaging lens) 1 includes, for example, a zoom lens, a focus lens, a diaphragm, and the like, and images an optical image of the subject which passes through these lenses.

The lens section 1 is rotatably supported to rotate around a vertical axis by a lens driving section 31a (described later) of the imaging control section 3 (see FIG. 2A to FIG. 2C).

The imaging element 2 is composed of an image sensor such as a CCD (Charge Coupled Device), a CMOS (Complementary Metal Oxide Semiconductor) and the like. The imaging element 2 converts the optical image which passes through the various lenses of the lens section 1 to a two dimensional image signal and outputs the signal to the unit circuit section 4.

The imaging element 2 is movably supported to move in the horizontal direction by an element driving section 32a (described later) of the imaging control section 3 (see FIG. 2A to FIG. 2C).

The imaging control section 3 controls operation of the lens section 1, the imaging element 2, etc. in imaging based on the instruction from the central control section 12. In other words, the imaging control section 3 controls driving of the lens motor (not illustrated) to move the zoom lens, focus lens, etc. of the lens section 1 on the optical axis, and controls timing of driving scanning by the imaging element 2.

The imaging control section 3 includes a lens operation control section 31 and an imaging element operation control section 32, and controls imaging of two images G1, G2 in which the relationship of the position of background B (see FIG. 5) with respect to a subject A (see FIG. 5) is different in each image. The images are used in generating the image data of the stereoscopic image G3.

The lens operation control section 31 controls operation of the lens section 1. Specifically, the lens operation control section 31 includes a lens driving section 31a and a first control section 31b.

The lens driving section 31a functions as a first driving section and is configured to enable the lens section 1 to rotate around the vertical axis (axis along a first direction which is orthogonal to the optical axis). In other words, the lens driving section 31a is able to rotate the lens section 1 in at least one direction between a direction rotating around a vertical axis substantially orthogonal to the disparity direction of both eyes of those who view the stereoscopic image G3 and the optical axis (for example, clockwise, etc.), and a direction opposite to such direction (for example, counter clockwise, etc.).

Here, when the apparatus is positioned in a state for horizontal capturing, the upper and lower direction of the apparatus is to be the vertical direction and the left and right direction is to be the disparity direction (see FIG. 2A, etc.). Alternatively, when the apparatus is positioned in a state for vertical capturing, the left and right direction of the apparatus is to be the vertical direction and the upper and lower direction is to be the disparity direction (not illustrated). The upper and lower direction and the left and right direction of the apparatus shown as an example of the vertical direction (a first direction orthogonal to the optical axis) is one example, and the vertical direction is not limited to the above. For when the apparatus is positioned in a state other than the state for horizontal capturing or vertical capturing, a diagonal direction with respect to the upper and lower direction and the left and right direction of the apparatus may be the vertical direction.

The lens driving section 31a includes, for example, a motor (a driving source), a cam (a power transmission mechanism), etc., and has substantially the same configuration as image stabilization of a lens unit swinging method. In other words, the lens driving section 31a has a configuration substantially the same as image stabilization of a yaw rotation centering around a rotating axis extending substantially parallel to the upper and lower direction of the apparatus and the image stabilization of a pitch rotation centering around a rotating axis extending substantially parallel to the left and right direction of the apparatus. The image stabilization of the lens unit swinging method is well known art and the detailed description is omitted. Here, a rotating axis 1a (see FIG. 2A, etc.) of the upper and lower direction is provided in substantially the center portion of the front and rear direction and the left and right direction of the lens section 1, and a rotating axis (not shown) of the left and right direction is provided in substantially the center portion of the front and rear direction and the upper and lower direction of the lens section 1.

When the lens section 1 is configured from a plurality of lenses, the lens driving section 31a can be configured so that all of the lenses are rotatable or at least one of the plurality of lenses is rotatable.

The first control section 31b controls the rotation of the lens section 1 around the vertical axis driven by the lens driving section 31a.

In other words, the first control section 31b functions as the first control section to adjust the rotating amount of the lens section 1 around the vertical axis in at least one of one direction and the other direction by the lens driving section 31a based on the distance between the apparatus and the subject A. In other words, the first control section 31b rotates the lens section 1 with the lens driving section 31a around the vertical axis in one direction and the other direction to relatively change the direction of the optical axis of the lens section 1. Then, the lens section 1, which is rotated in two states to relatively differ the direction of the optical axis, images two optical images where the relationship of the position of the background B with respect to the subject A is different.

Specifically, according to the length of the subject distance calculated by the subject distance calculating section 6, the first control section 31b changes the control of the motor (driving source) of the lens driving section 31a to adjust the rotating amount of the lens section 1 around the vertical axis.

For example, the first control section 31b controls the motor of the lens driving section 31a so that the rotating amount of the lens section 1 becomes small as the subject distance becomes far. The first control section 31b controls the motor of the lens driving section 31a so that the rotating amount of the lens section 1 becomes large as the subject distance becomes near (see FIG. 3).

In other words, the first control section 31b adjusts the rotating amount of at least one of one direction and the other direction around the vertical axis of the lens section 1 by the lens driving section 31a based on the position of the subject A in the angle of view. In other words, according to the subject position specified by the subject position specifying section 7, the first control section 31b changes the control of the motor (driving source) of the lens driving section 31a to adjust the rotating amount of the lens section 1 around the vertical axis.

Specifically, for example, when there is a subject A in substantially the center portion in the angle of view, the first control section 31b controls the lens driving section 31a so that the rotating amount of the lens section 1 in one direction and the other direction around the vertical axis becomes substantially equal. For example, when there is a subject A displaced from substantially the center portion of the angle of view in a predetermined direction (for example, right direction, etc.), the first control section 31b controls the lens driving section 31a so that the rotating amount of the lens section 1 in the direction the portion of the imaging element 2 side of the lens section 1 rotates which is toward the direction where the subject A is displaced becomes relatively larger than the rotating amount of the lens section 1 rotating in the opposite direction.

The imaging element operation control section 32 controls the operation of the imaging element 2. Specifically, the imaging element operation control section 32 includes an element driving section 32a and a second control section 32b.

The element driving section 32a functions as the second driving section and is configured to be able to move the imaging element 2 in a horizontal direction orthogonal to the vertical direction (second direction orthogonal to the optical axis and the first direction). In other words, the element driving section 32a can move the imaging element 2 back and forth in a horizontal direction substantially parallel to the disparity direction of both eyes of those viewing the stereoscopic image G3.

Here, when the apparatus is positioned in a state for horizontal capturing, the left and right direction of the apparatus is to be a horizontal direction (disparity direction) (see FIG. 2A, etc.), whereas when the apparatus is positioned in a state for vertical capturing, the upper and lower direction of the apparatus is to be a horizontal direction (disparity direction) (not shown). The left and right direction and the upper and lower direction of the apparatus illustrated as an example of the horizontal direction (second direction orthogonal to the optical axis and the first direction) are merely examples, and the present invention is not limited to the above. For example, when the apparatus is positioned in a state other than horizontal capturing and vertical capturing, the horizontal direction changes according to the above vertical direction (first direction orthogonal to the optical axis).

The element driving section 32a includes, for example a motor (a driving source), a cam (a power transmission mechanism), etc., and has substantially the same configuration as image stabilization of an imaging element shift method. In other words, the element driving section 32a has substantially the same configuration as the translational image stabilization of the upper and lower direction which moves the imaging element 2 in the direction substantially parallel to the upper and lower direction of the apparatus and the translational image stabilization of the left and right direction which moves the imaging element 2 in the direction substantially parallel to the left and right direction of the apparatus. Here, the image stabilization of the imaging element shift method is well known art, and therefore the detailed description is omitted.

The second control section 32b controls movement in the horizontal direction of the imaging element 2 by the element driving section 32a. In other words, the second control section 32b functions as the second control section and moves the imaging element 2 with the element driving section 32a in a direction substantially equal to the direction the optical axis of the lens section 1 is displaced by the rotation of the lens section 1 driven by the lens driving section 31a. In other words, the second control section 32b moves the imaging element 2 with the element driving section 32a in a direction substantially equal to the direction the optical axis of the lens section 1 is displaced. With this, the two optical images with a different relationship of position of the background B with respect to the subject A are imaged at a portion near the center portion of the imaging region of the imaging element 2.

Specifically, the second control section 32b moves the imaging element 2 with the element driving section 32a to follow the optical axis displaced by the rotation of the lens section 1. For example, in a case where the apparatus is positioned in a state of horizontal capturing, when the lens section 1 is rotated so that the optical axis of the lens section 1 is displaced to one side (for example, left side) of the horizontal direction with respect to the reference position (see FIG. 2A), the second control section 32b moves the imaging element 2 in the same direction with the element driving section 32a (see FIG. 2B). For example, when the lens section 1 is rotated so that the optical axis of the lens section 1 is displaced to the other side (for example, right side) of the horizontal direction with respect to the reference position (see FIG. 2A), the second control section 32b moves the imaging element 2 in the same direction with the element driving section 32a (see FIG. 2C).

Although illustration is omitted, in a case where the apparatus is positioned in a state of vertical capturing, similar to the above, the second control section 32b moves the imaging element 2 with the element driving section 32a in the horizontal direction so as to follow the displaced optical axis.

The second control section 32b adjusts the movement amount of the imaging element 2 in the horizontal direction by the element driving section 32a based on the distance between the apparatus and the subject. A. Specifically, according to the length of the subject distance calculated in the subject distance calculating section 6, the second control section 32b changes control on the motor (driving source) of the element driving section 32a to adjust the movement amount of the imaging element 2 in the horizontal direction.

Figure 3:
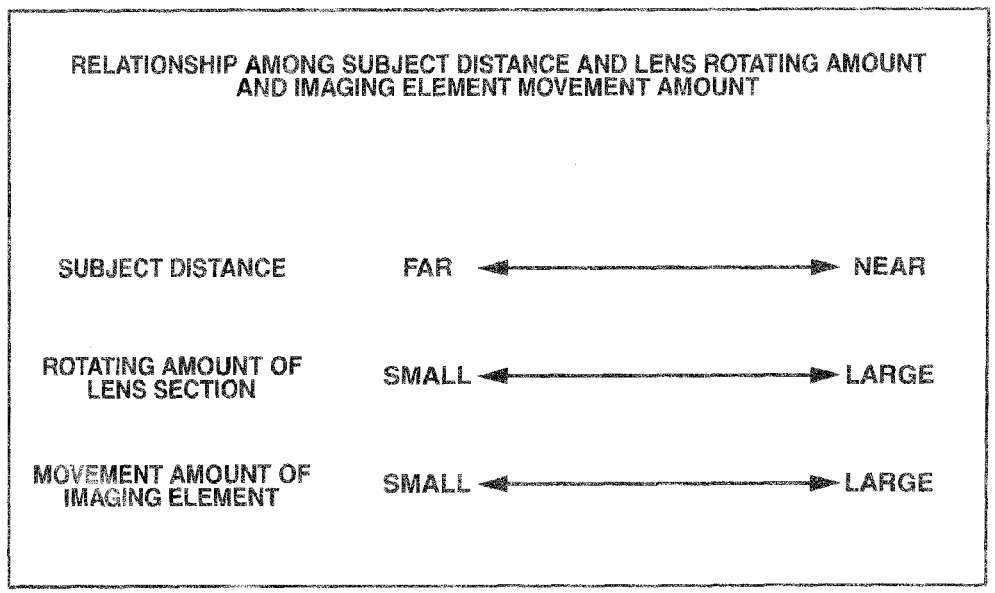
FIG. 3 is a diagram describing an operation of a lens section and an imaging element shown in FIG. 2A to FIG. 2C.

For example, the second control section 32b controls the motor of the element driving section 32a so that the movement amount of the imaging element 2 becomes small as the subject distance becomes far, and controls the motor of the element driving section 32a so that the movement amount of the imaging element 2 becomes large as the subject distance becomes near (see FIG. 3)

The second control section 32b adjusts the movement amount of the imaging element 2 in the horizontal direction with the element driving section 32a based on the position of the subject A in the angle of view. Specifically, according to the subject position specified by the subject position specifying section 7, the second control section 32b changes the control on the motor (driving source) of the element driving section 32a to adjust the movement amount of the imaging element 2 in the horizontal direction.

In other words, for example, when the subject A is in substantially the center portion of the angle of view, the second control section 32b controls the element driving section 32a so that the movement amount of the imaging element 2 in one direction and in the other direction of the horizontal direction are to b substantially the same amount. For example, when the subject A is displaced in a predetermined direction (for example, right direction, etc.) from substantially the center portion of the angle of view, the second control section 32b controls the element driving section 32a so that the movement amount of the imaging element 2 in the direction that the subject A is displaced is relatively larger than the movement amount of the imaging element 2 in the opposite direction (for example, left direction, etc.).

Then, the imaging control section 3 controls the timing of driving scanning by the imaging element 2 and allows the imaging element (obtaining section) 2 to obtain two image signals corresponding to two optical images where the relationship of the position of the background B with respect to the subject A is different.

Figure 6A:
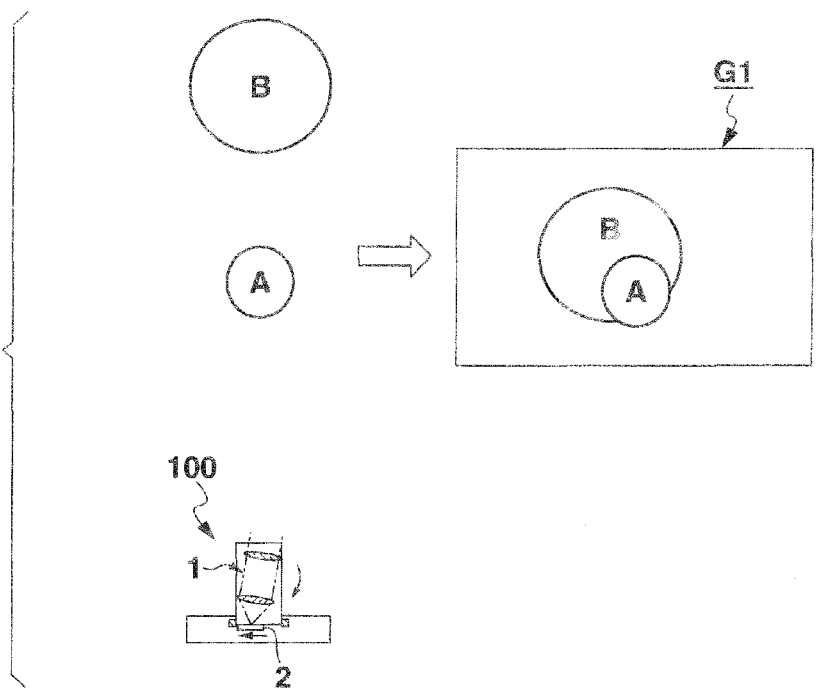
FIG. 6A and FIG. 6B are diagrams describing operation of the lens section and the imaging element in the imaging processing shown in FIG. 4.

In other words, in a state where the first control section 31b of the lens operation control section 31 rotates the lens section 1 with the lens driving section 31a in one direction around the vertical axis, and the second control section 32b of the imaging element operation control section 31 moves the imaging element 2 with the element driving section 32a in a direction substantially the same as the direction the optical axis of the lens section 1 is displaced (so as to follow the displaced optical axis), the imaging control section 3 drives the scanning by the imaging element 2 and allows the imaging element 2 to obtain an image signal corresponding to an optical image including a relationship of position of the background B with respect to the subject A (see FIG. 6A). With this, the image G1 in a state viewing the subject A from the left side is imaged without changing the position of the apparatus relatively to the left side with respect to the subject A.

Figure 6B:
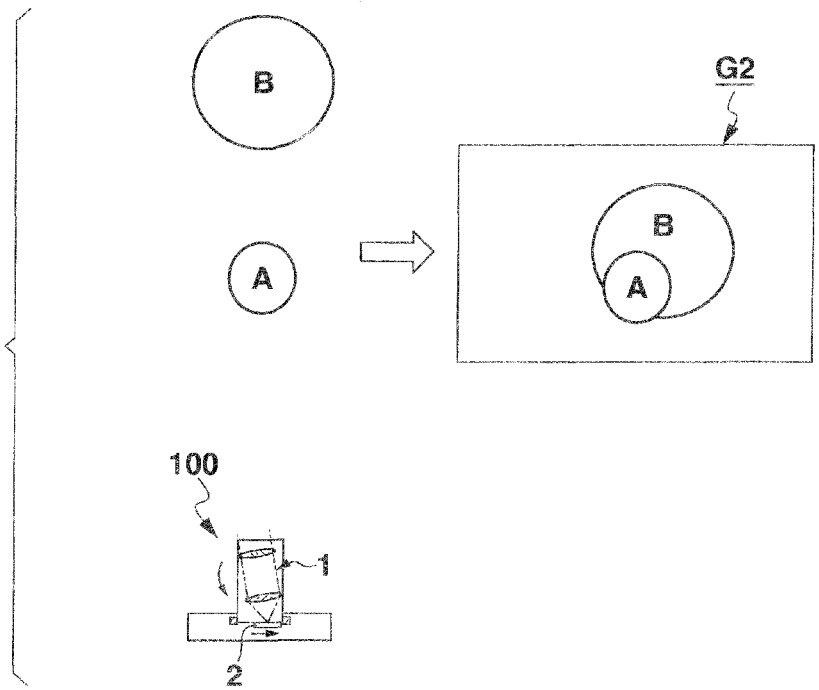

Then, in a state where the first control section 31b of the lens operation control section 31 rotates the lens section 1 with the lens driving section 31a in the other direction around the vertical axis, and the second control section 32b of the imaging element operation control section 32 moves the imaging element 2 with the element driving section 32a in a direction substantially the same as the direction the optical axis of the lens section 1 is displaced, the imaging control section 3 drives scanning by the imaging element 2 and allows the imaging element 2 to obtain the other image signal corresponding to the other optical image including the other relationship of position of the background B with respect to the subject A (see FIG. 6B). With this, the image G2 in a state viewing the subject A from the right side is imaged without changing the position of the apparatus relatively to the right side with respect to the subject A.

For example, although illustration is omitted, the unit circuit section 4 includes CDS (Correlated Double Sampling), AGC (Auto Gain Control), ADC (Analog to Digital Converter), etc. The unit circuit section 4 holds the input analog image signal output from the imaging element 2 with the CDS and after the image signal is amplified with the AGC, the amplified image signal is converted to the digital image signal with the ADC.

The image data processing section 5 performs processing on the image signal after A/D conversion, such as RGB interpolation processing which generates color component data of RGB (RGB data) for each pixel, YUV conversion processing which generates YUV data including a luminance signal (Y) and a chrominance signal (U, V) for each pixel from the RGB data, and digital signal processing to enhance image quality such as automatic white balance, contour enhancement, etc. The image data processing section 5 sequentially outputs the YUV data of each frame image after conversion to the memory 10 to be stored in the memory 10.

When the image is recorded, the image data processing section 5 compresses the YUV data according to a predetermined encoding format (for example, JPEG format, motion JPEG format, MPEG format, etc.) to be output to the storage medium control section 8.

When the image is played and displayed, the image data processing section 5 decodes the image data of the still image or moving image of the display target read out from the storage medium M by the storage medium control section 8 according to the corresponding predetermined encoding format to be output to the display control section 9b. Here, the image data processing section 5 can reduce the size of the read out image data to a predetermined size (such as VGA or QVGA size) based on, for example, display resolution of the display panel 9a to be output to the display control section 9b.

The image data processing section 5 includes an image generating section 5a which generates image data of a stereoscopic image G3.

The image generating section 5a functions as a generating section to generate image data of the stereoscopic image G3 on the two image signals obtained by the imaging element 2. In other words, the image generating section 5a generates image data complying to the predetermined format of the stereoscopic image G3 based on the YUV data of the two images G1, G2 generated from the two image signals corresponding to the two optical images with different relationship of position of the background B with respect to the subject A (See FIG. 7, etc.). Here, the YUV data of the two images G1, G2 used in generating the stereoscopic image G3 are imaged in a state where the rotating amount of the lens section 1 rotating around the vertical axis in one direction or the other direction is adjusted based on the subject distance or the subject position. Therefore, the image generating section 5a can add a suitable 3D effect to the stereoscopic image G3 by combining the YUV data of the two images G1, G2 so as to overlap the position of the subject A.

The size of the stereoscopic image G3 is determined by the position of the subject A in the YUV data of the two images G1, G2. In other words, only the region included in both YUV data of the two images G1, G2 are to be the region other than the subject A in the stereoscopic image G3. Therefore, when the imaging element 2 is moved in the horizontal direction to follow the displaced optical axis of the lens section 1, the size (region other than the subject A in the stereoscopic image G3) of the stereoscopic image G3 in the horizontal direction becomes large (see FIG. 7), and when the imaging element 2 is not moved in the horizontal direction, the size of the stereoscopic image G3 in the horizontal direction becomes small (see FIG. 8).

Figure 7:
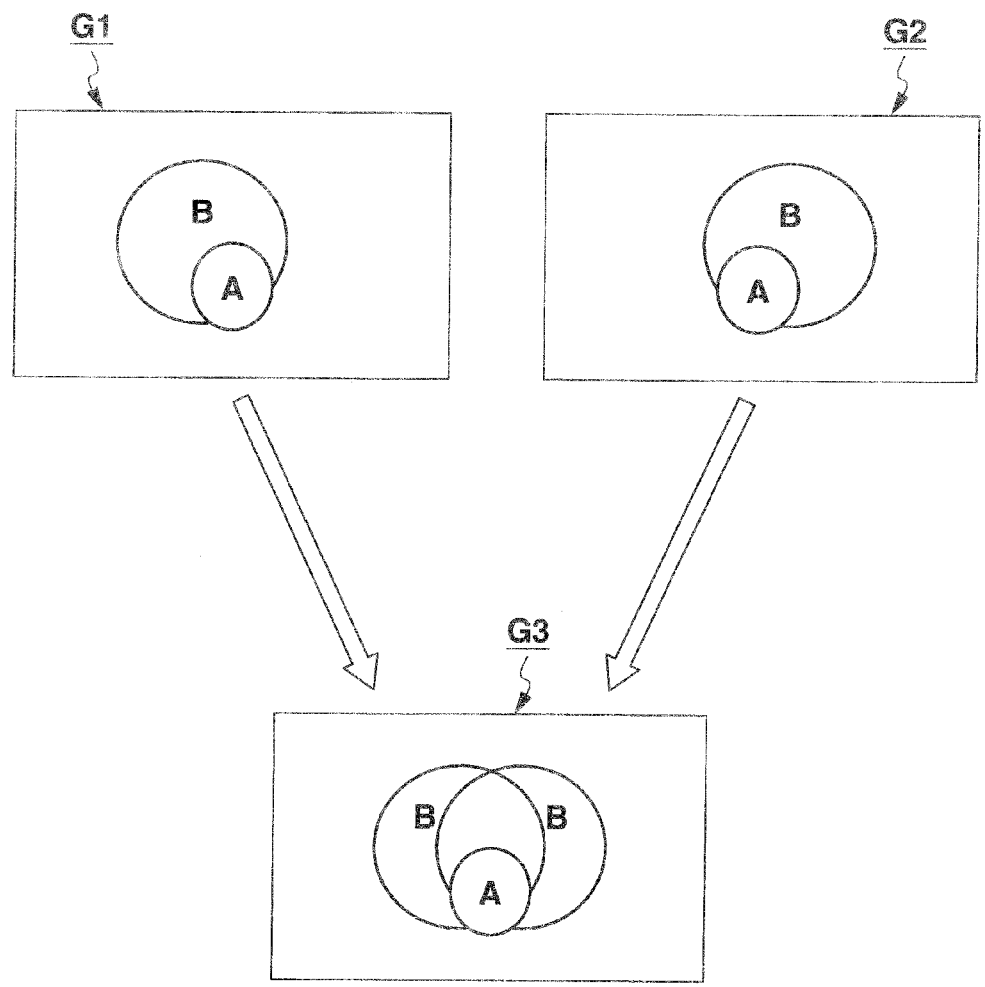
FIG. 7 is a diagram describing generating a stereoscopic image by the imaging processing shown in FIG. 4.
Figure 8:
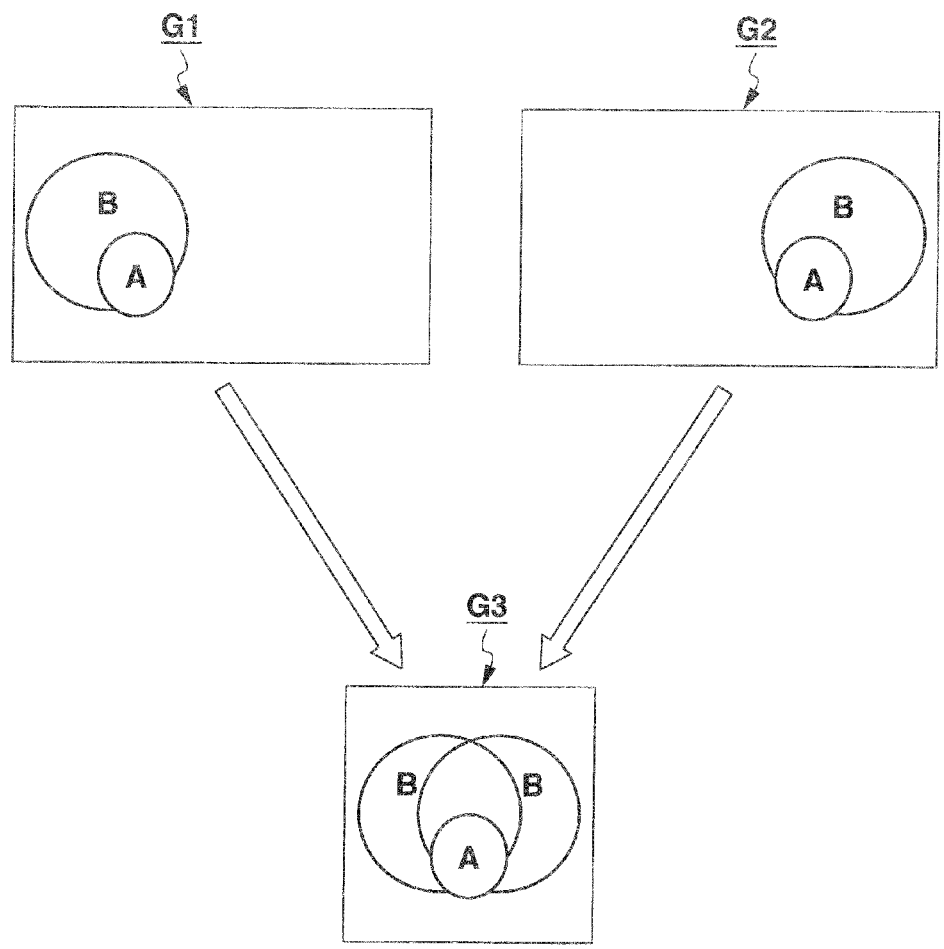
FIG. 8 is a diagram describing generating a stereoscopic image by the imaging processing shown in FIG. 4.

The stereoscopic image G3 illustrated in FIG. 7 and FIG. 8 is one example and the present invention is not limited to the above. For example, the stereoscopic image G3 can be changed freely as long as image data according to the display format of a display, a projector, etc. is used.

The subject distance calculating section 6 calculates the subject distance between the apparatus and the subject A.

Specifically, for example, in a state where the subject A is focused in the image by automatic focusing processing, the subject distance calculating section 6 obtains lens position information corresponding to the position of the focus lens in the optical axis direction from a focusing control section (not shown) of the imaging control section 3 and calculates the subject distance based on the lens position information using a predetermined converting section (for example, converting program, converting table, etc.).

The subject position specifying section 7 specifies the subject position where the subject A is in the angle of view.

Specifically, for example, in a state where the subject A is focused in the image by automatic focusing processing, the subject position specifying section 7 specifies as the subject position a coordinate position (x, y) of a predetermined portion (for example, substantially the center portion, etc.) of the subject A based on a predetermined position (for example, upper left edge section, etc.) in a two dimensional planar space defined by two axes (for example, x axis y axis, etc.) orthogonal to each other.

For example, in the storage medium control section 8, a storage medium M such as a nonvolatile memory (flash memory) is attached detachably. The storage medium control section 8 controls reading of data from the attached storage medium M and writing of data on the storage medium M.

In other words, the storage medium control section 8 stores in a predetermined storage region of the storage medium M image data for storage encoded in a predetermined compression format (for example, JPEG format, motion JPEG format, MPEG format, etc.) by an encoding section (not shown) of the image data processing section 5.

The display section 9 includes a display panel 9a and a display control section 9b.

The display panel 9a displays an image in a display region. For example, as the display panel 9a, there is a liquid crystal display panel, an organic EL display panel, or the like, however, these are merely examples and the present invention is not limited to the above.

The display control section 9b controls display of a predetermined image on the display screen of the display panel 9a based on the image data of a predetermined size decoded by the image data processing section 5 read out from the storage medium M. Specifically, the display control section 9b includes a VRAM (Video Random Access Memory), a VRAM controller, and a digital video encoder. The digital video encoder reads out the luminance signal Y and the chrominance signal Cb, Cr decoded by the image data processing section 5 and stored in the VRAM (not shown) from the VRAM through the VRAM controller at a predetermined, playback frame rate (for example, 60 fps) and generates a video signal based on the above data to be output to the display panel 9a.

When the stereoscopic image G3 is displayed, the display control section 9b displays an image for a right eye and an image for a left eye alternately switching at a predetermined time interval.

The memory 10 includes a buffer memory which temporarily stores image data, etc., a working memory such as a central control section 12, etc., a program memory in which various programs and pieces of data regarding the function of the imaging apparatus 100 are stored (all of the above are not shown) and the like.

The operation input section 11 is for performing predetermined operation of the imaging apparatus 100. Specifically, the operation input section 11 includes an operation section such as a power source button regarding ON/OFF of the power source of the apparatus, a shutter button regarding an imaging instruction of the subject A, a selection enter button regarding a selection instruction of the imaging mode, the function, etc., a zoom button regarding adjustment instruction of the zoom amount (all of the above are not shown) and the like. The operation input section 11 outputs to the central control section 12 a predetermined operation signal according to predetermined operation of each button of the operation section by the user.

For example, the central control section 12 includes a one chip microcomputer including a CPU which controls each section of the imaging apparatus 100.

The central control section 12 controls each section of the imaging apparatus 100 based on the input operation signal output from the operation input section 11. Specifically, when the imaging instruction signal output according to a predetermined operation of the shutter button of the operation input section 11 is input, the CPU of the central control section 12 controls driving timing of the imaging element 2 with the imaging control section 3 to perform processing of capturing a still image according to a predetermined program stored in the program memory. The YUV data for one frame stored in the buffer memory by capturing the still image is compressed and encoded to a JPEG format, etc. by the image data processing section 5 and stored as still image data in the storage medium M.

Next, the imaging processing of the imaging apparatus 100 is described with reference to FIG. 4 to FIG. 8.

Figure 4:
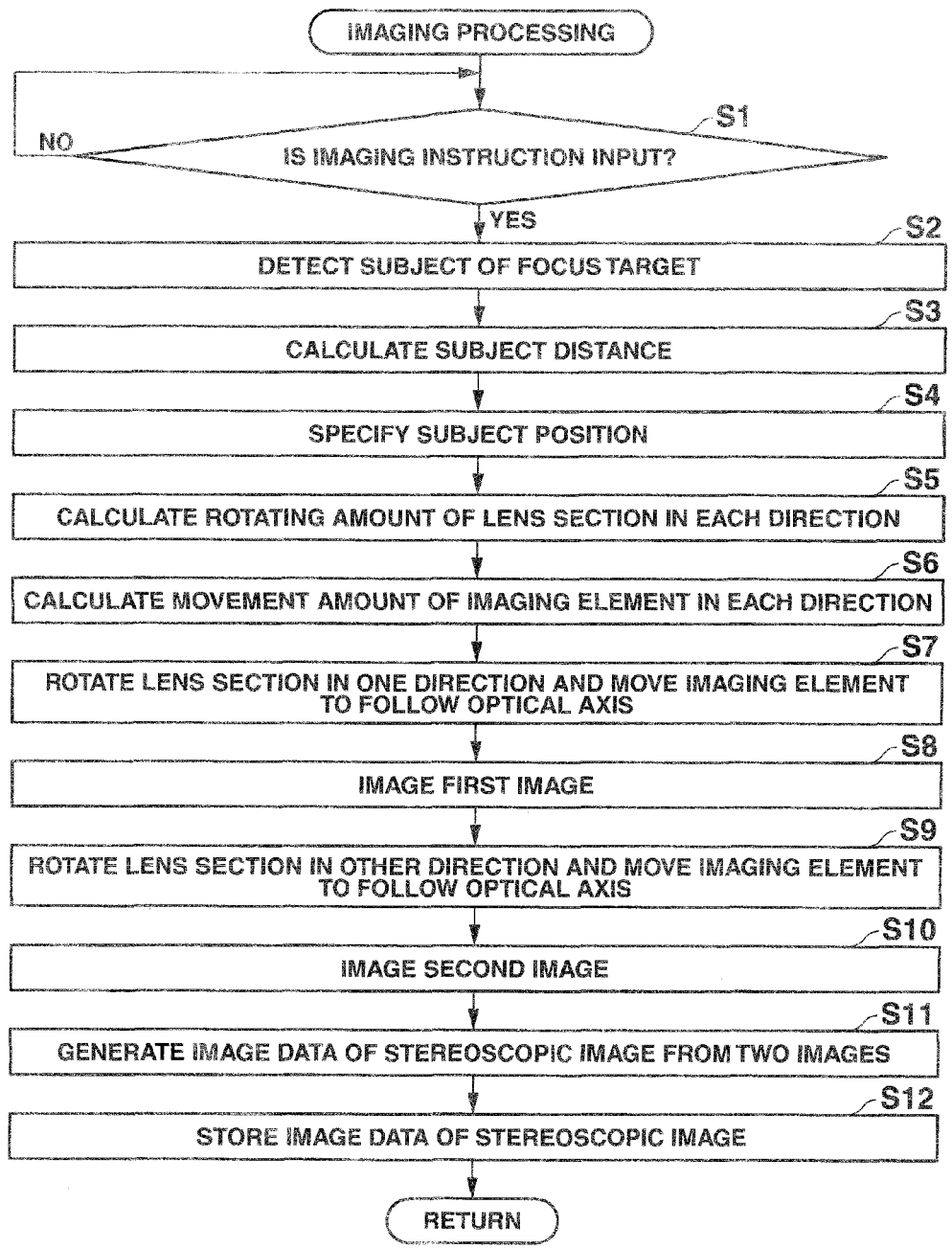
FIG. 4 is a flowchart showing an example of operation of imaging processing by the imaging apparatus shown in FIG. 1.
Figure 5:
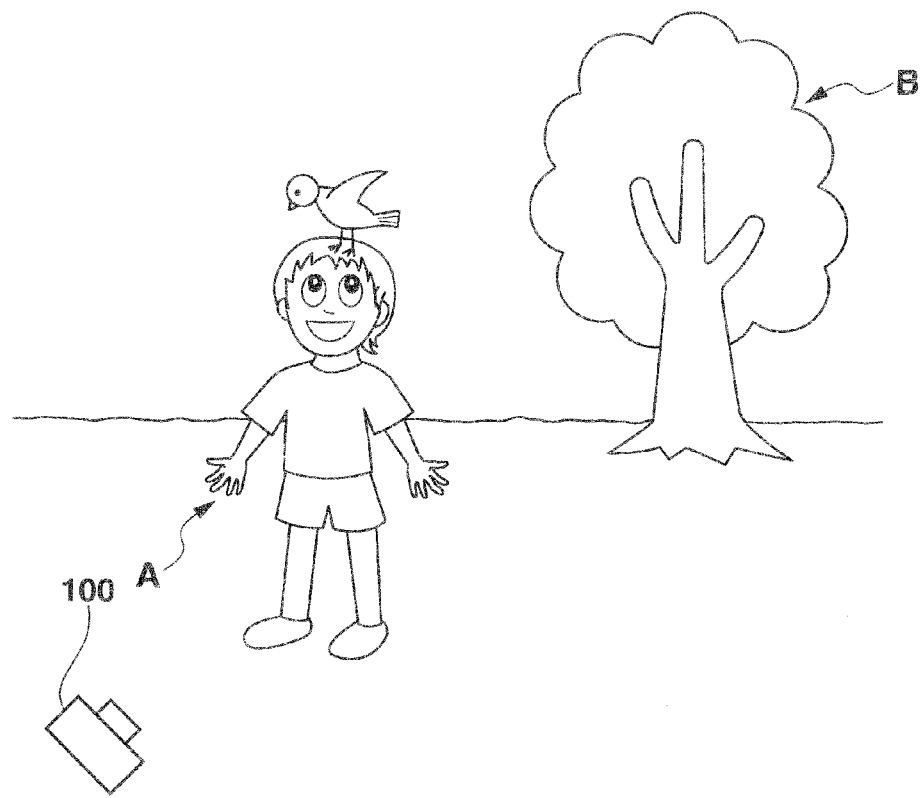
FIG. 5 is a diagram describing imaging processing shown in FIG. 4.

FIG. 4 is a flowchart showing an example of an operation regarding the imaging processing. FIG. 5 is a diagram which describes imaging processing. FIG. 6A and FIG. 6B are diagrams which describe operation of the lens section 1 and the imaging element 2 by the imaging processing. FIG. 7 and FIG. 8 are diagrams which describe generating the stereoscopic image G3 with the imaging processing.

FIG. 6A, FIG. 6B, FIG. 7 and FIG. 8 schematically show the subject A and the background B shown in FIG. 5.

When the stereoscopic image G3 is generated with the imaging processing described below, it is preferable that imaging is performed with a composition where the subject A is in substantially the center portion of the angle of view regardless of whether the apparatus is positioned in a state of horizontal capturing or vertical capturing.

As shown in FIG. 4, first, the CPU of the central control section 12 judges whether or not the imaging signal output based on the predetermined operation of the shutter button of the operation input section 11 is input by the user (step S1). The judgment of whether or not the imaging instruction is input in step S1 is repeatedly performed at a predetermined time interval until it is judged that the imaging instruction is input (step S1; YES).

In step S1, when it is judged that the imaging instruction is input (step S1; YES), the image data processing section 5 performs the automatic focusing processing and detects the subject A of the focus target (step S2). Specifically, for example, the image data processing section 5 extracts an image region (candidate region) which is to be the candidate of the subject A by various image processing such as face detection processing, edge detection processing, feature detection processing, etc. and among the extracted candidate regions, detects the subject which satisfies predetermined identification conditions as the subject A.

Next, the subject distance calculating section 6 calculates the subject distance between the apparatus and the subject A (step S3). Specifically, the subject distance calculating section 6 calculates the subject distance using the predetermined converting section (for example, converting program, converting table, etc.) based on the lens position information corresponding to the position of the optical axis direction of the focus lens.

Next, the subject position specifying section 7 specifies the subject position where the subject A is in the angle of view (step S4). Specifically, the subject position specifying section 7 specifies as the subject position the coordinate position (x, y) of substantially the center portion of the subject A based on the predetermined position in the two dimensional planar space (for example, upper left edge section, etc.).

The order of the calculating processing of the subject distance and the specifying processing of the subject position is one example. The order is not limited to the above and can be reversed.

Next, the first control section 31b of the lens operation control section 31 calculates the rotating amount of the lens section 1 around the vertical axis in one direction and the other direction by the lens operation control section 31 based on the subject distance or the subject position (step S5). In other words, the first control section 31b calculates the rotating amount of the lens section 1 around the vertical axis in one direction and the other direction to image the image G1 in a state of viewing the subject A from the left side and the image G2 in a state of viewing the subject A from the right side.

Then, the second control section 32b of the imaging element operation control section 32 calculates the movement amount of each direction in the horizontal direction of the imaging element 2 by the element driving section 32a based on the subject distance or subject position (step S6). In other words, the second control section 32b calculates the movement amount when the imaging element 2 is moved by the element driving section 32a in directions in the horizontal direction so as to follow the optical axis displaced by the rotation of the lens section 1 to image the image G1 in a state of viewing the subject A from the left side and the image G2 in a state of viewing the subject A from the right side.

Next, the first control section 1 rotates the lens section 1 around the vertical axis in one direction with the lens driving section 31a according to the calculated rotating amount and the second control section 32b moves the imaging element 2 with the element driving section 32a in a direction substantially the same as the direction that the optical axis of the lens section 1 is displaced according to the calculated movement amount (step S7). In this state, the image control section 3 drives the scanning of the imaging element 2 to image an image signal corresponding to the image (first image) G1 in a state of viewing the subject A from the left side (step S8; see FIG. 6A). Then, the image data processing section 5 converts the image signal of the first image G1 corresponding to the state of viewing the subject A from the left side to a digital image signal and generates the YUV data of the image G1.

Then, the first control section 31b rotates the lens section 1 around the vertical axis in the other direction with the lens driving section 31a according to the calculated rotating amount, and the second control section 32b moves the imaging element 2 with the element driving section 32a in a direction substantially the same as the direction that the optical axis of the lens section 1 is displaced according to the calculated movement amount (step S9). In this state, the image control section 3 drives the scanning of the imaging element 2 to image an image signal corresponding to the image (second image) G2 in the state of viewing the subject A from the right side (step S10; see FIG. 6B). Then, the image data processing section 5 converts the image signal of the second image G2 corresponding to the state of viewing the subject A from the right side to a digital image signal, and generates the YUV data of the image G2.

The order of imaging processing of the image G1 in the state of viewing the subject A from the left side and the image G2 in the state of viewing the subject A from the right side is one example. The order is not limited to the above and can be reversed.

Next, the image generating section 5a of the image data processing section 5 generates image data of the stereoscopic image G3 based on the YUV data of the first image G1 corresponding to the state of viewing the subject A from the left side and the second image G2 corresponding to the state of viewing the subject A from the right side (step S11; see FIG. 7).

Then, after the encoding section of the image data processing section 5 encodes the image data of the stereoscopic image G3 in a predetermined compressed format, the storage medium control section 8 generates a file of the image data of the stereoscopic image in a predetermined format (for example, Exif format, etc.) to be stored in the storage medium M (step S12).

With this, the imaging processing ends.

As described above, according to the imaging apparatus 100 of the present embodiment, the image data of the stereoscopic image G3 is generated based on two image signals corresponding to two optical images which pass through the lens section 1 rotated in two states around the vertical axis substantially orthogonal to the disparity direction of both eyes viewing the stereoscopic image G3 to make the direction of the optical axis relatively different so that the relationship of the position of the background B with respect to the subject A is different (two image signals on which photoelectric conversion is performed by the imaging element 2). Therefore, it is possible to obtain two image signals corresponding to two optical images with different relationship of position of the background B with respect to the subject A with one imaging instruction without relatively changing the position of the apparatus with respect to the subject A in a configuration of a single lens including one set of lens section 1 and imaging element 2. Further, a special configuration to generate image data of the stereoscopic image G3 is not necessary and it is possible to reduce the costs.

In other words, for example, compared to the twin lens imaging apparatus, not only is it possible to make the case size of the apparatus small, but it is also possible to relatively reduce the number of expensive components such as the lens section 1, imaging element 2, and the like. With the twin lens imaging apparatus, it is necessary to perform imaging by positioning the apparatus so that the positioning direction of the lens section 1 is in the same direction as the disparity direction of both eyes of a human. However, according to the imaging apparatus 100 of the present embodiment, the lens section 1 can rotate freely around the vertical axis. Therefore, the positioning of the apparatus such as horizontal capturing and vertical capturing, in other words, composition of the image is not limited. Moreover, for example, in the conventional single lens imaging apparatus which can generate the stereoscopic image G3, imaging could be performed only under very limited conditions and environment. However, according to the present embodiment, there are no such limits.

Therefore, according to the imaging apparatus 100 which is a single lens type, it is possible to generate image data of the stereoscopic image G3 easily and inexpensively.

The rotating amount of the lens section 1 around the vertical axis in at least one of one direction and the other direction is adjusted based on the distance (subject distance) between the apparatus and the subject A or the position (subject position) of the subject A in the angle of view. Therefore, even if the subject distance or the subject position changes, it is possible to add a suitable 3D effect to the stereoscopic image G3. Moreover, it is possible to image two images G1, G2 used in generating the stereoscopic image G3 in a state where the rotating amount of the lens section 1 around the vertical axis in one direction and the other direction is adjusted based on the subject distance and the subject position. Therefore, it is possible to provide a suitable 3D effect to the stereoscopic image G3 by combining the two images G1, G2 so that the position of the subject A overlap on each other, and it is possible to generate the image data of the stereoscopic image G3 more simply.

Further, the imaging element 2 is moved in a horizontal direction in a direction substantially the same as the direction to which the optical axis of the lens section 1 is displaced by the rotation of the lens section 1. Therefore, it is possible to image two optical images with a relationship of the position of the background B with respect to the subject A being different in a portion closer to the center portion of the imaging region of the imaging element 2. Therefore, it is possible to make the size of the stereoscopic image G3 generated based on the image signals corresponding to the two optical images larger in the horizontal direction.

Specifically, the movement amount of the imaging element 2 in the horizontal direction is adjusted based on the distance (subject distance) between the apparatus and the subject A and the position (subject position) of the subject A in the angle of view. Therefore, even if the rotating amount of the lens section 1 changes according to the change of the subject distance or the subject position, it is possible to move the imaging element 2 with the element driving section 32a to follow the displaced optical axis of the lens section 1. Therefore, it is possible to image two optical images with the relationship of the position of the background B with respect to the subject A being different in a portion closer to the center portion of the imaging region of the imaging element 2.

The present invention is not limited to the above described embodiments, and various modifications and changes in designs can be made without leaving the scope of the invention.

For example, in the present embodiment, the image data of the stereoscopic image G3 is generated as a still image. However, it is possible to generate the image data of the moving image in which frame images of the stereoscopic image 3 are arranged with a predetermined time interval in between. Here, similar to the above embodiment, the rotating amount of the lens section 1 around the vertical axis in one direction and the other direction is adjusted for each frame image based on the subject distance and the subject position. Therefore, even if the subject distance or the subject position sequentially changes by sequential displacement of the relative position between the subject the apparatus, it is possible to apply the suitable 3D effect to the stereoscopic image G3 as the moving image.

In the above described embodiments, the adjustment of the rotating amount of the lens section 1 is performed based on the subject distance and the subject position. However, this is one example, and the present invention is not limited to the above. The subject distance and the subject position do not necessarily need to be used as the standard. In other words, it is possible to suitably change freely whether to include the subject distance calculating section 6 and the subject position specifying section 7.

Further, according to the above described embodiment, the imaging element 2 is moved in the horizontal direction, in the direction substantially the same as the direction the optical axis of the lens section 1 is displaced by the rotation of the lens section 1. However, this is one example, and the present invention is not limited to the above. It is possible to suitably change freely whether or not to move the imaging element 2.

Similarly, the movement amount of the imaging element 2 is adjusted based on the subject distance and the subject position. However, this is one example, and the present invention is not limited to the above. The subject distance and the subject position do not necessarily need be used as the standard.

According to the present embodiment, the lens section 1 is rotated. However, for example, the lens tube including the lens section 1 can be rotated.

Moreover, according to the present embodiment, the lens section 1 is rotatable in both directions of one direction and the other direction around the vertical axis by the lens operation control section 31, however, this is one example and the present invention is not limited to the above. The lens section 1 does not necessarily need to be rotatable in both directions. In other words, for example, after imaging the image G1 in a state viewing the subject A from one side of left or right, then the lens section 1 is rotated in a predetermined direction around the vertical axis with the lens operation control section 31, and then the image G2 in a state viewing the subject A from the other side of left or right can be imaged.

Similarly, the imaging element 2 is movable in both directions of the horizontal direction by the imaging element operation control section 32, however, this is one example and the present invention is not limited to the above. The imaging element 2 does not necessarily need to be movable in both directions. In other words, for example, after imaging the image G1 in a state viewing the subject A from one side of left or right, the imaging element 2 is moved in a predetermined direction in the horizontal direction with the imaging element operation control section 32 according to the rotation of the lens section 1, and then the image G2 is imaged in a state viewing the subject. A from the other side of left or right.

The configuration of the imaging apparatus 100 as shown in the above embodiment is one example, and the present invention is not limited to the above. For example, it is possible to generate the image data of the stereoscopic image G3 by attaching a convertor including a lens rotatable as described in the present invention to the front side of the lens section 1 of the imaging apparatus 100 in which the lens section 1 does not rotate.

Further, for example, when the imaging element 2 is not moved in the horizontal direction so as to follow the displaced optical axis of the lens section 1 (see FIG. 8), the imaging element operation control section 32 can operate the imaging element 2 for image stabilization in imaging.

In addition, according to the present embodiment, the functions of the obtaining section and the generating section are realized by driving the imaging element 2 and the image data processing section 5 under the control of the central control section 12. However, the present invention is not limited to the above, and a predetermined program, etc. can be executed by the CPU of the central control section 12 to realize the above functions.

In other words, a program including an obtaining processing routine and a generating processing routine is stored in the program memory (not shown) which stores a program. Then, by executing the obtaining processing routine, it is possible to allow the CPU of the central control section 12 to function as the obtaining section which obtains two image signals corresponding to two optical images which pass through an imaging lens rotated in two states by the first driving section to make the direction of the optical axis relatively different so that the relationship of the position of the background B with respect to the subject A is different. Moreover, by executing the generating processing routine, it is possible to allow the CPU of the central function section 12 to function as the generating section which generates image data of the stereoscopic image G3 based on the two image signals obtained by the obtaining section.

As the computer readable storage medium storing the program to execute the above processing, other than a ROM or a hard disk, etc., a nonvolatile memory such as a flash memory, etc. or a portable storage medium such as a CD-ROM, etc. can be applied. Moreover, as a medium to provide data of the program through a predetermined communication line, a carrier wave can be applied.

Although various embodiments of the present invention have been described, the present invention is not limited to the above embodiments, and the present invention includes the scope of the invention as described in the claims and its equivalents.

What is claimed is:

1. A single lens imaging apparatus comprising:
   a single imaging lens section which is rotatable around an axis along a first direction orthogonal to an optical axis so that a relationship of a position of background with respect to a subject in an optical image is changed;
   a first driving section which rotates the single imaging lens section around the axis;
   an obtaining section which includes an imaging element;
   a second driving section which moves the imaging element along a second direction in which the imaging element is moveable; and
   a second control section which controls the second driving section to move the imaging element in a same direction as a direction in which the optical axis of the single imaging lens section is displaced by the rotation of the single imaging lens section by the first driving section, wherein the second control section adjusts a movement amount of the imaging element by the second driving section based on a position of the subject in a field of view, and wherein the obtaining section obtains, at different times, two image signals by performing photoelectric conversion with the imaging element which is moved by the second driving section by the movement amount which is adjusted by the second control section, the two image signals corresponding to two optical images which respectively pass through the single imaging lens section at different times before and after a rotation thereof by the first driving section and in which the relationship of the position of the background with respect to the subject is different; and a generating section which generates image data of a stereoscopic image based on the two image signals respectively obtained by the obtaining section before and after the rotation, wherein, when the subject is displaced in one direction along the second direction from substantially a center portion of the angle of view, the second control section controls the second driving section to move the imaging element such that the movement amount of the imaging element in a first moving direction determined in accordance with the one direction is larger than the movement amount of the imaging element in a second moving direction opposite to the first moving direction.

2. The single lens imaging apparatus according to claim 1, further comprising a first control section which adjusts a rotating amount of the single imaging lens section in at least one of a first rotating direction and a second rotating direction around the axis along the first direction by the first driving section based on a distance between the apparatus and the subject.

3. The single lens imaging apparatus according to claim 1, further comprising a first control section which adjusts a rotating amount of the single imaging lens section in at least one of a first rotating direction and a second rotating direction around the axis along the first direction by the first driving section based on a position of the subject in an angle of view.

4. A method implemented by a single lens imaging apparatus including (i) a single imaging lens section which is rotatable around an axis along a first direction orthogonal to an optical axis so that a relationship of a position of background with respect to a subject in an optical image is changed; (ii) a first driving section which rotates the single imaging lens section around the axis; (iii) an imaging element; and (iv) a second driving section which moves the imaging element along a second direction in which the imaging element is moveable, the method comprising:

rotating, by the first driving section, the single imaging lens section around the axis:

moving, by the second driving section, the imaging element in a same direction as a direction in which the optical axis of the single imaging lens section is displaced by the rotation of the single imaging lens section by the first driving section, and adjusting a movement amount of the imaging element by the second driving section based on a position of the subject in a field of view;

obtaining, at different times, two image signals by performing photoelectric conversion with the imaging element which is moved by the second driving section by the adjusted movement amount, the two image signals corresponding to two optical images which respectively pass through the single imaging lens section at different times before and after a rotation thereof by the first driving section and in which the relationship of the position of the background with respect to the subject is different; and generating image data of a stereoscopic image based on the two image signals respectively obtained by the obtaining before and after the rotation, wherein, when the subject is displaced in one direction along the second direction from substantially a center portion of the angle of view, the second driving section is controlled to move the imaging element such that the movement amount of the imaging element in a first moving direction determined in accordance with the one direction is larger than the movement amount of the imaging element in a second moving direction opposite to the first moving direction.

5. The method according to claim 4, further comprising adjusting a rotating amount of the single imaging lens section in at least one of a first rotating direction and a second rotating direction around the axis along the first direction by the first driving section based on a distance between the apparatus and the subject.

6. The method according to claim 4, further comprising adjusting a rotating amount of the single imaging lens section in at least one of a first rotating direction and a second rotating direction around the axis along the first direction by the first driving section based on a position of the subject in an angle of view.

7. A non-transitory computer-readable storage medium having stored thereon a program that is executable by a computer of a single lens imaging device including (i) a single imaging lens section which is rotatable around an axis along a first direction orthogonal to an optical axis so that a relationship of a position of background with respect to a subject in an optical image is changed; (ii) a first driving section which rotates the single imaging lens section around the axis; (iii) an imaging element; and (iv) a second driving section which moves the imaging element along a second direction in which the imaging element is moveable, the program controlling the computer to perform functions comprising:

controlling the first driving section to rotate the single imaging lens section around the axis;

controlling the second driving section to move the imaging element in a same direction as a direction in which the optical axis of the single imaging lens section is displaced by the rotation of the single imaging lens section by the first driving section, and adjusting a movement amount of the imaging element by the second driving section based on a position of the subject in a field of view;

obtaining, at different times, two image signals by performing photoelectric conversion with the imaging element which is moved by the second driving section by the adjusted movement amount, the two image signals corresponding to two optical images which respectively pass through the single imaging lens section at different times before and after a rotation thereof by the first driving section and in which the relationship of the position of the background with respect to the subject is different; and generating image data of a stereoscopic image based on the two image signals respectively obtained by the obtaining before and after the rotation, wherein, when the subject is displaced in one direction along the second direction from substantially a center portion of the angle of view, the second driving section is controlled to move the imaging element such that the movement amount of the imaging element in a first moving direction determined in accordance with the one direction is larger than the movement amount of the imaging element in a second moving direction opposite to the first moving direction.

8. The storage medium according to claim 7, wherein the program controls the computer to further perform a function comprising adjusting a rotating amount of the single imaging lens section in at least one of a first rotating direction and a second rotating direction around the axis along the first direction by the first driving section based on a distance between the apparatus and the subject.

9. The storage medium according to claim 7, wherein the program controls the computer to further perform a function comprising adjusting a rotating amount of the single imaging lens section in at least one of a first rotating direction and a second rotating direction around the axis along the first direction by the first driving section based on a position of the subject in an angle of view.

10. The single lens imaging apparatus according to claim 3, wherein the first control section controls the first driving section such that, when the position of the subject is displaced from the center portion in the one direction in the angle of view, the rotating amount of the single imaging lens section in the first rotating direction, which is determined in accordance with the one direction, is larger than the rotating amount of the single imaging lens section in the second rotating direction opposite to the first rotating direction, and such that, when the position of the subject is substantially centered in the angle of view, the rotating amount of the single imaging lens section in the first rotating direction is substantially the same as the rotating amount of the single imaging lens section in the second rotating direction.

11. The method according to claim 6, wherein the adjusting includes controlling the first driving section such that, when the position of the subject is displaced from the center portion in the one direction in the angle of view, the rotating amount of the single imaging lens section in the first rotating direction, which is determined in accordance with the one direction, is larger than the rotating amount of the single imaging lens section in the second rotating direction opposite to the first rotating direction, and such that, when the position of the subject is substantially centered in the angle of view, the rotating amount of the single imaging lens section in the first rotating direction is substantially the same as the rotating amount of the single imaging lens section in the second rotating direction.

12. The storage medium according to claim 9, wherein the adjusting includes controlling the first driving section such that, when the position of the subject is displaced from the center portion in the one direction in the angle of view, the rotating amount of the single imaging lens section in the first rotating direction, which is determined in accordance with the one direction, is larger than the rotating amount of the single imaging lens section in the second rotating direction opposite to the first rotating direction, and such that, when the position of the subject is substantially centered in the angle of view, the rotating amount of the single imaging lens section in the first rotating direction is substantially the same as the rotating amount of the single imaging lens section in the second rotating direction.

13. The single lens imaging apparatus according to claim 1, wherein, when the subject is positioned substantially at the center portion of the angle of view, the second control section controls the second driving section to move the imaging element such that the movement amount of the imaging element in the first moving direction is substantially the same as the movement amount of the imaging element in the second moving direction opposite to the first moving direction.

14. The method according to claim 4, wherein, when the subject is positioned substantially at the center portion of the angle of view, the second driving section is controlled to move the imaging element such that the movement amount of the imaging element in the first moving direction is substantially the same as the movement amount of the imaging element in the second moving direction opposite to the first moving direction.

15. The storage medium according to claim 7, wherein, when the subject is positioned substantially at the center portion of the angle of view, the second driving section is controlled to move the imaging element such that the movement amount of the imaging element in the first moving direction is substantially the same as the movement amount of the imaging element in the second moving direction opposite to the first moving direction.

\* \* \* \* \*